March 29, 1966  O. MANNING  3,243,210
VALVE HANDLE
Filed Jan. 23, 1964  2 Sheets-Sheet 1
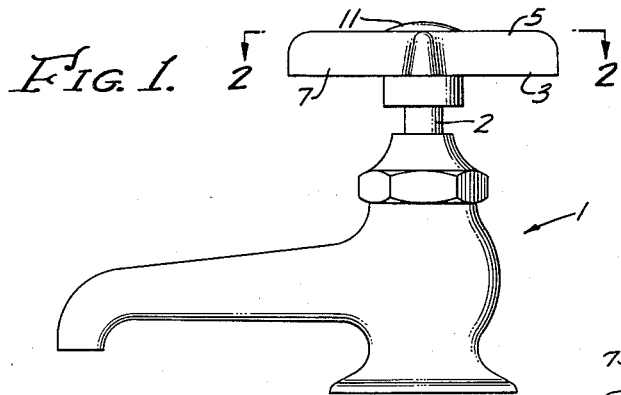
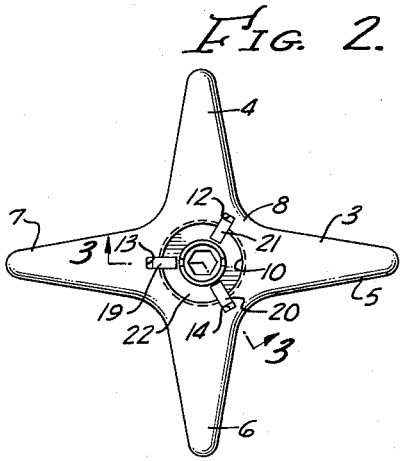
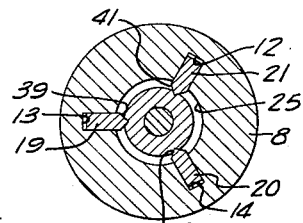
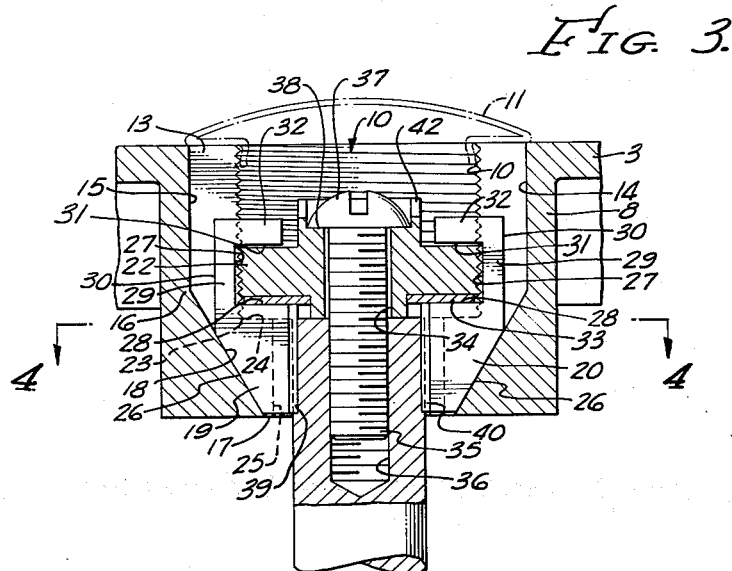
INVENTOR.
OSCAR MANNING
BY  W.E. Beatty
ATTORNEY.

March 29, 1966  O. MANNING  3,243,210
VALVE HANDLE
Filed Jan. 23, 1964  2 Sheets-Sheet 2
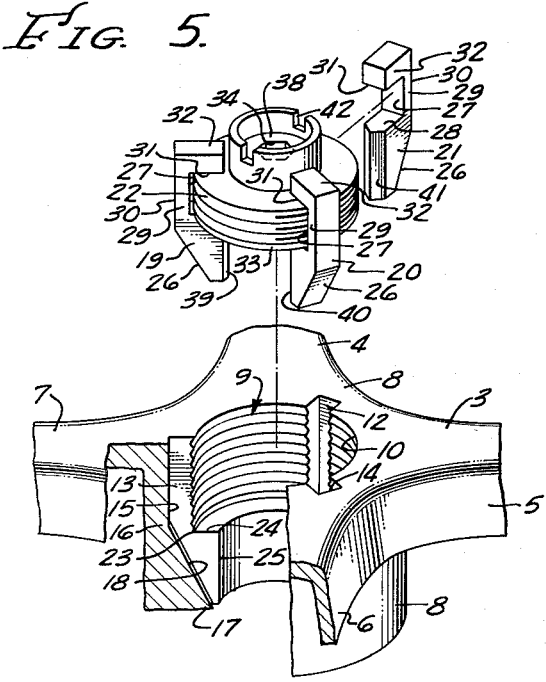
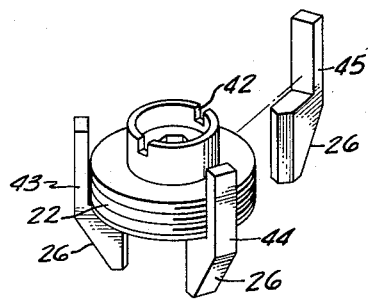
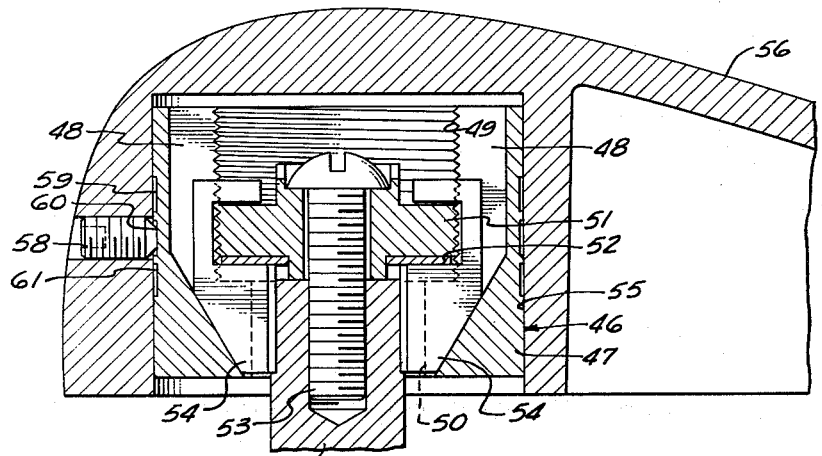
INVENTOR.
OSCAR MANNING
BY
W E Beatty
ATTORNEY.

United States Patent Office 3,243,210
Patented Mar. 29, 1966

3,243,210
VALVE HANDLE
Oscar Manning, Van Nuys, Calif., assignor to Kwix-On Mfg. Co., Van Nuys, Calif., a corporation of California
Filed Jan. 23, 1964, Ser. No. 339,663
7 Claims. (Cl. 287—53)

The invention relates to a valve handle and more particularly to a valve handle suitable for replacing another valve handle which may have become broken or damaged.

With a replacement type of valve handle, the problem is to provide a handle which will fit securely on various types and sizes of valve stems. For example, the various stems may be round and either smooth, threaded or broached. Also the valve stem may be non-circular. All of these types of stems may be of different sizes.

An object of the present invention is to provide a valve handle which will securely and readily fit various types and sizes of valve stems. While the preferred use of the valve handle of this invention is as a replacement item, it may also be used as an original valve handle.

A further object of the present invention is to cause the jaws to grip the valve stem with great force. In the present invention, a bushing applies a force along the axis to thereby cam the jaws in a radial direction to grip the valve stem.

A further object is to adapt the device for use in a dome-type handle. This is accomplished by constructing the working parts in the form of an insert fitting in a cavity in the handle, means being provided for longitudinally adjusting the position of the handle on the insert after the insert has been fixed to the stem.

A still further object is to prevent the jaws from falling away from or dropping out of operative relation with the bushing when the parts are being assembled. This is accomplished by providing a loose swivel connection between the jaws and the nut to form a unit.

For further details of the invention reference may be made to the drawings wherein:

FIG. 1 is a side view, in elevation, of a faucet having the valve handle of this invention.

FIG. 2 is a top plan view of FIG. 1.

FIG. 3 is an enlarged sectional view on the broken line 3—3 of FIG. 2.

FIG. 4 is a reduced sectional view on line 4—4 of FIG. 3.

FIG. 5 is an exploded perspective view, partially in section, of the parts in FIG. 3 with the valve stem and its holding screw removed.

FIG. 6 is a sectional view, corresponding to FIG. 3, of a valve handle holder in the form of an insert for a dome handle.

FIG. 7 is a perspective view, corresponding to the top portion of FIG. 5, of a modification of the jaws, eliminating the top overhang.

Referring in detail to the drawings, the faucet 1 has a valve stem 2 having the handle 3 of this invention. In this form, the handle has 4 arms 4, 5, 6, 7 merging with a central body portion 8 having a threaded bore 9, open at its top as indicated by 10, and is provided with a removable cover 11. The bore 9 is intersected lengthwise by three equally spaced slots 12, 13, 14, each slot, as indicated for slot 13 in FIG. 3, has an outer wall 15 which is parallel to the axis of the stem 2, the wall 15 extending from the open top 10 to a point 16, midway of the body, and from the point 16 to the reduced open lower end 17 of the body, the wall 15 tapers inwardly as indicated at 18, providing a cam surface to force its jaw 19 inwardly when such jaw is forced downwardly by the threaded bushing 22. Jaw 20 is for slot 14 and jaw 21 is for slot 12.

As shown in FIG. 5, bore 9 terminates at an intermediate point in the body 8, as indicated at 23, having an annular shoulder 24 which opens into the smooth reduced bore 25. The bores 9 and 25 provide an opening throughout the whole depth of body 8.

Each of the jaws 19, 20, 21 may be of case hardened steel having a bevel jaw face 39, 40, 41 each such face extending tangent to a cylinder coaxial with the bore 9, and such cylinder having a diameter smaller than that of bore 9.

Each jaw like 19 slidably fits in its slot like 13, each jaw having a taper 26 at its lower, outer edge to match the taper of the cam wall like 18. Each jaw like 19 has a recess 27 to receive the bushing 22, each such recess being defined by a shoulder 28, the longitudinal wall 29 at the inside of the leg 30 and the inside wall 31 of the overhang 32. Each of the three jaws 19–21 thus has a swivel connection with the bushing 22, the shoulder 28 and overhang 32 extending parallel to each other opposite the inner and outer ends of the margin of the bushing, being connected by the leg 30 which extends lengthwise opposite the outer margin of the bushing.

Between the underside of the bushing 22 and the shoulder 28 is arranged an annular washer 33. The bushing 22 has a smooth bore 34 to receive the screw 35 which mates with the threaded bore 36 in the valve stem 2, screw 35 having a head 37 which bears on a shoulder 38 at the top of the bushing.

As a result of this construction, each jaw has a swivel connection with the bushing 22 which limits longitudinal movement in either direction of the jaws with respect to the bushing to prevent the jaws from falling out of their slots during assembly even though the handle 3 is turned upside down. On tightening the screw 35, the bushing 22, acting on the washer 33 and shoulder like 28 of each jaw, positively forces all of the jaws inwardly along the axis of the valve stem to thereby force the jaw faces radially inwardly due to coaction of the cam walls like 18 and the respective cam surface like 26 on the jaw.

Bushing 22 is shorter than threaded bore 9, see FIGS. 3 and 5. When bushing 22 is at the inner end of bore 9, both the outer end of this bushing and the head 37 of screw 35 are located inside of bore 9.

As shown in FIG. 5, each of the slots 12, 13, 14 is of uniform width having parallel sidewalls to slidably receive the respective jaws which are also of uniform width. Bushing 22 has a kerf 42 for a screwdriver or similar tool which can be inserted into position through the open upper end of the threaded bore 9.

In FIG. 7, the overhang 32 has been omitted from each of the jaws 43, 44, 45. Otherwise, the construction is the same as before.

In FIG. 6, the valve stem gripper is in the form of a separate unit constituting an insert 46 having a body member in the form of a cylindrical casing 47 having three slots like 48, a threaded bore 49, open at its top, leading into a smaller bore 50 with a bushing 51, washer 52, and screw 53 and with a jaw like 54 for each slot as shown and described in connection with FIGS. 1–5. The casing 47 fits in a cylindrical cavity 55 at the underside of a dome-type handle 56. The insert 46 is placed on the valve stem 57 and secured thereto by applying a screwdriver to the screw 53 at a time when the handle 56 is removed, and thereafter when the insert 46 is fixed on the stem 57, the handle 56 is secured in position on the insert by means of a set screw 58. The casing 47 may have longitudinally spaced grooves 59, 60 and 61 to adjust the position of the handle 56 on the insert 46.

Various other modifications may be made in the invention without departing from the spirit of the claims. For example, the form in FIG. 6 may have a removable cover over the top of the threaded bore as in FIG. 3.

It will be noted that each jaw throughout its length fits in its slot which prevents the jaws from wobbling, or loosening, during use of the device.

To facilitate rotation of bushing 22, its bore 34 may be noncircular such as hexagonal for an Allen wrench.

I claim:

1. In a valve handle, a body member having a through bore, the outer end portion of said bore having threads and being of a certain size, and the inner portion of said bore being smooth and of a smaller size, said body member having a shoulder at the junction of said bores, a plurality of spaced slots longitudinally intersecting both of said bores, the outer wall of the inner end portion of each of said slots having a cam surface tapering in toward the axis of said bores in a direction inwardly of said axis, a jaw member slidably fitting each of said slots, each jaw member having a cooperating cam surface and having a shoulder in a plane at right angles to said axis, a bushing being shorter than said outer end threaded portion of said through bore, said bushing having threads mating with the threads of said threaded bore, said bushing having shoulder means engageable with the shoulders of said jaws to force said jaws inwardly in an axial direction to thereby force said jaw members radially inward by coaction of said cooperating cam surfaces, and means for securing said bushing to a valve stem with the outer end of said bushing extending inside of said through bore.

2. In a valve handle according to claim 1, each of said jaw members having an extension slidable in its said slot, each extension having a leg extending across the edge and an overhang extending over the top of said bushing and forming a swivel coupling between said bushing and said jaw members.

3. In a valve handle according to claim 1, said body member being in the form of an insert, in combination with a valve handle having a recess in which said insert fits, and means for longitudinally adjusting the position of said insert on said handle.

4. In a valve handle according to claim 1, said securing means comprising a screw engageable in an axial threaded bore in the valve stem, said screw having a head engageable with a shoulder on said bushing, said screw having a shank loosely fitting in a central bore in said bushing with the head of said screw inside of said through bore.

5. In a valve handle, a body member having an outer threaded bore and an inner smaller coaxial bore, a longitudinal slot through said bores, a jaw member slidable in said slot and having a bevel edge adapted to extend within said smaller bore with an extension on said jaw member extending outside of said threaded bore, a bushing having a threaded edge mating with said threaded bore, said jaw extension fitting said slot opposite said edge of said bushing, cooperating cam surfaces on said slot and on said jaw member opposite its said bevel edge, and cooperating transverse shoulders on said bushing and on said jaw member at opposite ends of said bushing for operating said jaw member on rotation of said bushing.

6. A valve handle comprising a body having a cavity, an insert unit fitting in said cavity, said insert unit having a valve stem grip carried by and having a swivel connection with a rotatable threaded member, said insert unit having an upper access opening for operating said grip to thereby hold said insert unit in a certain position, means for securing said body on said insert unit in adjusted position, and a cover for said opening.

7. In a valve handle,
 (a) a body member having a through bore,
 (b) the outer end portion of said bore having threads and being of a certain size, and
 (c) the inner portion of said said bore being smooth and of a smaller size,
 (d) said body member having a shoulder at the junction of said bores,
 (e) a plurality of spaced slots longitudinally intersecting both of said bores,
 (f) the outer wall of the inner end portion of each of said slots having a cam surface tapering in toward the axis of said bores in a direction inwardly of said axis,
 (g) a jaw member slidably fitting each of said slots,
 (h) each jaw member having a cooperating cam surface, and
 (i) having a shoulder in a plane at right angles to said axis, and
 (j) a bushing having threads mating with the threads of said threaded bore,
 (k) said bushing being shorter than said outer end threaded portion of said through bore,
 (l) said bushing having shoulder means engageable with the shoulders of said jaws to force said jaws inwardly in an axial direction to thereby force said jaw members radially inward by coaction of said cooperating cam surfaces.

References Cited by the Examiner

UNITED STATES PATENTS

| 620,612 | 3/1899 | Reynolds | 279—60 |
|---|---|---|---|
| 1,343,086 | 6/1920 | Neil. | |
| 2,540,656 | 2/1951 | Courtot. | |
| 2,719,047 | 9/1955 | Bayes et al. | |
| 2,812,962 | 11/1957 | Parkes | 287—53 |

FOREIGN PATENTS

| 1,159,515 | 2/1958 | France. |
|---|---|---|

CARL W. TOMLIN, *Primary Examiner.*

A. V. KUNDRAT, *Assistant Examiner.*